United States Patent [19]
Thiem

[11] Patent Number: 5,099,728
[45] Date of Patent: Mar. 31, 1992

[54] SWING ARM BRAKE LATHE

[76] Inventor: Eugene G. Thiem, 7100 SE. 138 St., Hobe Sound, Fla. 33455

[21] Appl. No.: 590,140

[22] Filed: Sep. 28, 1990

[51] Int. Cl.⁵ .............................................. B23B 5/02
[52] U.S. Cl. .......................................... 82/112; 82/128
[58] Field of Search ................ 82/112, 146, 128; 142/49

[56] References Cited

U.S. PATENT DOCUMENTS

| | | |
|---|---|---|
| 2,663,975 | 12/1953 | Barrett ................... 82/112 X |
| 3,026,752 | 3/1962 | Zabel . |
| 3,049,953 | 8/1962 | Barrett ................... 82/112 X |
| 3,079,731 | 3/1963 | Rawstron et al. ............ 51/58 |
| 3,245,292 | 4/1966 | Kushmuk . |
| 3,442,164 | 5/1969 | Blazek .................... 82/112 |
| 3,500,589 | 3/1970 | Ellege ................... 51/132 |
| 4,061,060 | 12/1977 | Trautmann . |
| 4,063,577 | 12/1977 | Tennant ................. 82/112 X |
| 4,140,032 | 2/1979 | Besenbruch et al. .......... 82/112 |
| 4,165,662 | 8/1979 | Besenbruch et al. .......... 82/112 |
| 4,226,146 | 10/1980 | Ekman .................... 82/112 |
| 4,349,945 | 9/1982 | Fox ...................... 29/27 A |
| 4,452,111 | 6/1984 | Anderson ................. 82/112 |
| 4,455,900 | 6/1984 | Callanan et al. ........... 82/112 |
| 4,478,116 | 10/1984 | Fuller ................... 82/112 |
| 4,506,570 | 3/1985 | Wood et al. .............. 82/112 |
| 5,523,499 | 6/1985 | Aldrige. Jr. ............. 82/112 |

Primary Examiner—Z. R. Bilinsky
Attorney, Agent, or Firm—Hedman, Gibson & Costigan

[57] ABSTRACT

A brake lathe for machining both brake drums and brake rotors wherein the tool carriage assembly is pivotable through an arc of about 90° thereby allowing the tool carriage to engage the friction surfaces of either a brake drum or rotor on a fixed spindle. In the drum machining position, the tool carriage assembly is approximately parallel to the axis of the spindle and when in the disc machining position the tool carriage assembly is approximately perpendicular to the axis of the spindle. The lathe further includes alignment means to assure proper alignment of the tool carriage assembly with the spindle, and release means to remove the tool carriage assembly from the remainder of the lathe for service.

10 Claims, 4 Drawing Sheets

SWING ARM BRAKE LATHE

FIELD OF THE INVENTION

The present invention relates to metal turning apparatus and more particularly to a portable special purpose lathe for machining the friction surfaces of brake drums and disc brake rotors or for boring, facing, and turning surfaces of other components, particularly automotive parts, such as flywheels, starters and generator armatures, alternator slip rings, small shafts and the like.

BACKGROUND OF THE INVENTION

It has long been known to use heavy machinery to provide precision in finishing metal parts. Lathes and milling machines are examples of machinery that rely on sharp cutting tools to machine metal parts into specific items with close dimensional tolerances.

Typically, lathes are equipped with rotating spindles on which the workpieces are mounted and slide assemblies to mount the cutting tool. As the workpiece is rotated, the sharp cutting tool is advanced, either automatically or manually, into engagement with the workpiece to trim or shave metal from the workpiece until the desired circular dimension is achieved for a particular length of the workpiece. Concentricity of the rotating spindle and alignment between the spindle and the tool mount path is critical.

More recently, specialty lathes have been developed that are dedicated to performing specific tasks where large volume repetitive takes are involved. One example of a dedicated lathe is the brake lathe where the considerable volume brake drums or other brake parts needing restoration justifies a dedicated piece of equipment in an automotive repair business.

Originally, brake lathes were developed to finish the true brake drum surfaces that had been scored or unevenly worn/ Later, brake lathes were developed to restore and true disc brake rotors. The brake drum restoration operation requires the trueing of the inner surface diameter of the drum whereas the restoration of disc brake rotors generally requires refinishing the outer surfaces of the rotor.

There is a significant need in the art for brake lathes which are extremely compact, which are of a simple design for ease of maintenance, which are capable of refinishing brake drums and rotors, and which can be converted quickly from drum to rotor refinishing or from rotor to drum refinishing without the removal or addition of cutting tools. The prior art brake lathes, however, do not have all of the above characteristics.

For example, U.S. Pat. No. 4,455,900 discloses a brake lathe having a rotatable spindle so that its tool slide only needs to move in one direction and the drum or rotor being worked upon can be oriented to the direction of movement of the tool slide. The rotatable spindle design, however, is undesirable as it makes the resulting brake lathe rather large and complex.

Also, U.S. Pat. No. 4,506,570 discloses a lathe apparatus having a pair of substantially identical tool slide modules mounted on the lathe housing at right angles to each other. The shortcoming of this design is that the brake lathe is relatively complex because it has two servomotor driven slide modules, rather than the conventional single slide module.

In addition, U.S. Pat. No. 4,226,146 discloses a portable lathe having a driving device, which is adapted to rotate the brake rotor via a clutch device when the brake rotor is still mounted on the wheel shaft and from which the vehicle wheel has been dismounted. The deficiency of this prior art brake lathe is that it cannot conveniently refinish both drums and rotors as the lathe is intended to refinish primarily brake rotors.

SUMMARY OF THE INVENTION

It is a primary object of the present invention to provide a brake lathe which can be converted quickly from brake drum to brake rotor refinishing or from brake rotor to brake drum refinishing without the removal or addition of cutting tools.

Another object of the present invention is to overcome the shortcomings of the prior art by providing a brake lathe which is extremely compact, which is of a simple design for ease of maintenance and which is capable of refinishing both brake drums and rotors.

These and other objects are provided by a brake lathe comprising a spindle on which a piece to be tooled is mounted, drive means for rotating said spindle, a tool carriage assembly including a tool carriage and tool carriage drive means to move the tool carriage, tool carriage assembly mounting means including pivot means to pivot the tool carriage through an arc of about 90° to dispose the tool carriage either approximately parallel to the axis of the spindle in a brake drum machining position or approximately perpendicular to the axis of the spindle in a brake rotor machining position.

The pivot means includes a pin on which the tool carriage assembly pivots and locking means to releasably lock the tool carriage assembly in either the drum tooling or rotor tooling positions. The pivot means is further releasable to allow removal of the entire tool carriage assembly for maintenance, etc.

The tool carriage assembly preferably comprises a tool carriage having a tool race with two cutting tools movably attached thereto, tool carriage drive means to move the tool carriage and all of the related electronics except the main motor which drives the workpiece on the lathe. The tool carriage drive means preferably comprises a lead screw coupled with the tool carriage and rotated by an electric motor and/or a hand wheel to move the tool carriage in a defined direction to perform a working operation.

BRIEF DESCRIPTION OF THE DRAWINGS

The present invention will be better understood when reviewed with the following drawings, in which like reference characters represent like parts. These drawings, however, are not intended to limit the invention in any manner whatsoever, limited only by the appended claims.

DETAILED DESCRIPTION OF THE PREFERRED EMBODIMENT

Figure 2:
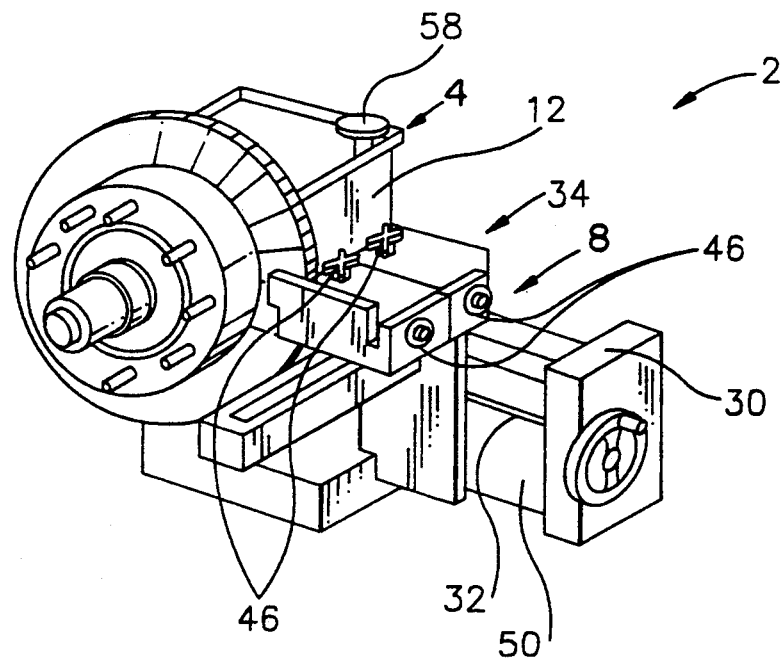
FIG. 2 is a perspective view showing the brake lathe of the present invention in the position for machining of a brake rotor or flywheel, etc.
Figure 4:
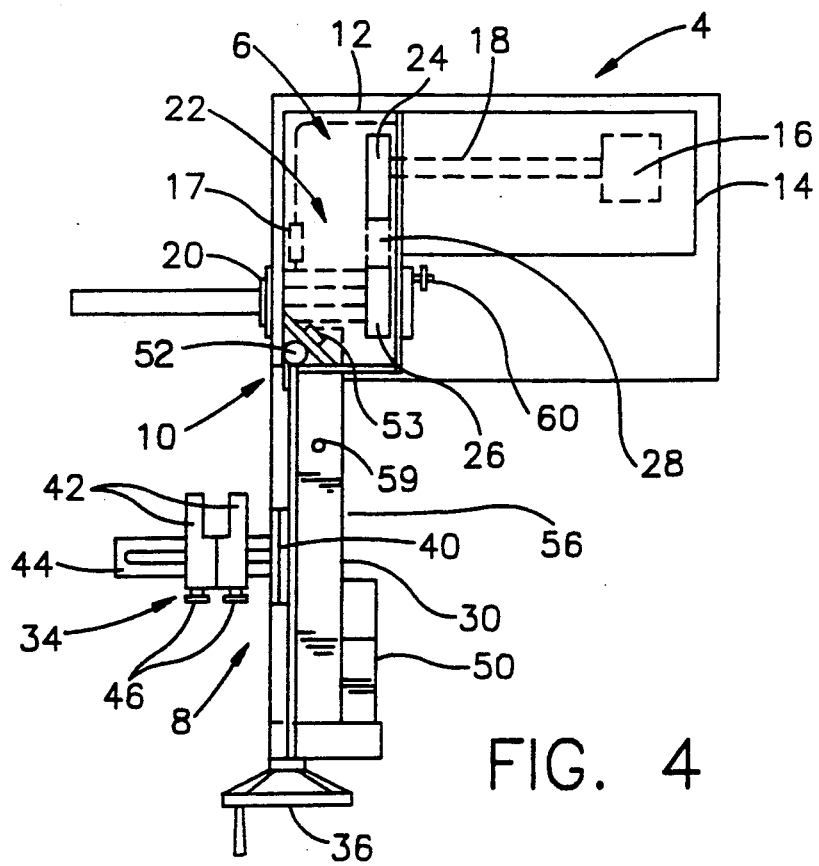
FIG. 4 is a top plan view, partially in section, showing the brake lathe of the present invention in the position for machining of a brake rotor.

The brake lathe 2 of the present invention is depicted in the accompanying FIGURES in both the brake drum machining mode and the brake rotor or flywheel machining mode. In FIGS. 1, 3, 5 and 6, the brake lathe 2 is shown in the position for machining a brake drum. In FIGS. 2 and 4, the brake lathe 2 is shown in the position for machining of a brake rotor or flywheel.

In essence, the brake lathe 2 is comprised of a housing 4, a spindle assembly 6, a pivotable tool carriage assembly 8 and a mounting assembly 10 for the pivotable tool carriage assembly 8.

The housing 4 is comprised of an essentially vertically disposed spindle housing section 12 and a horizontal support section 14 provided with apertures (not shown) to facilitate the releasable mounting of the lathe 2 to a work bench, etc., with conventional means such as anchor bolts. The housing sections 12 and 14 have removable housing covers to provide access to the internal components.

The spindle assembly 6, best shown in FIGS. 3-6, is comprised of a main drive motor 16 located within the horizontal support section 14, a drive shaft 18, a lathe spindle 20 and power transmission means 22. The power transmission means 22 is comprised of a gear 24 secured to the drive shaft 18, a spindle gear 26 on which the spindle 20 is concentrically mounted and a timing drive belt 28. A conventional removable arbor 29 which allows for different diameter shafts is provided on which to mount the workpiece.

The pivotable tool carriage assembly 8 is comprised essentially of a carriage mount 30, a conventional lead screw 32 mounted in lead screw blocks (not shown), a tool carriage 34, a hand wheel 36, a tool carriage drive motor 38 and all the electronics except the main motor 16 located in the housing 4. The tool carriage 34 includes a conventional mount or slide section 40, tool holder 42 and tool race 44, and is mounted to the carriage mount 30 in conventional slides (not shown). Micrometer screws 46 are provided to afford accurate adjustment for tool location and orientation. Screw knobs 48 are used to securely connect the tool holder 42 to the tool race 44 when the tool is aligned with the surface of the workpiece to be finished. The tool slide section 40 is connected to the lead screw 32 which may be power driven by the tool motor located in the tool motor housing 50 or may be advanced by a conventional hand operated hand wheel 36.

The mounting assembly 10 is comprised of a vertically arranged pin 52 removably held in place by two support bolts 53, and pivot arm locks 58 and 60 for the drum and rotor machining positions. The vertically arranged pin 52 is positioned in the corner of the spindle housing section 12 nearest the spindle 20 and the tool carriage assembly 8 and engages an aperture in the tool carriage assembly 8.

Two support bolts 53, one located above and one below the engagement with the tool carriage assembly 8, hold the pin 52 in place. Removal of the assembly 8 is provided by removal of the support bolts 53 when the assembly 8 is in the rotor position, returning the asembly 8 to the drum position and sliding the pin 52 out of an aperture 15 in the housing immediately below the pin 52. An electrical harness jack connector 17, including all electrical connections between the housing 4 and the tool carriage assembly 8, is used to facilitate removal of the assembly 8.

The drum position lock 58 is located above the housing 4 and comprises a screw down assembly which engages a detent 59 in the tool carriage assembly 8. The depth of the detent 59, and correspondingly the throw of the screw down assembly 58, need not be substantially more than ⅛ inch to securely retain the tool carriage assembly 8 in the drum machining position.

The rotor position lock 60 is located on the side of the housing 4 and engages an aperture 61 in the side of the tool carriage assembly 8 to lock the assembly 8 in the rotor machining position. The rotor position lock 60 preferably comprises a spring loaded ball lock pin which picks up the aperture 61 when the assembly 8 pivots into the rotor machining position. A CARR LANE MANUFACTURING Co., Part No. CL-6-ABP, T-handle ball lock pin has been found to work well in this application.

An extension 5 from the carriage housing 4 extends beyond the contour of the housing 4 when the tool carriage assembly 8 is in the brake drum machining position and bears against the housing 4 when the tool carriage assembly 8 is in the disc brake machining position to prevent further rotation of the tool carriage assembly 8. The rotor position lock 60 picks up an aperture 61 in extension 5 to lock the assembly 8 in place automatically.

Proper alignment of the pivotable tool carriage assembly 8 is assured by adjustment screws 64 and 66 for fine adjustment of the asssembly 30 in the rotor and drum machining positions, respectively. The adjustment screws 64 and 66 engage the housing 4 when in the respective positions.

Figure 7A:
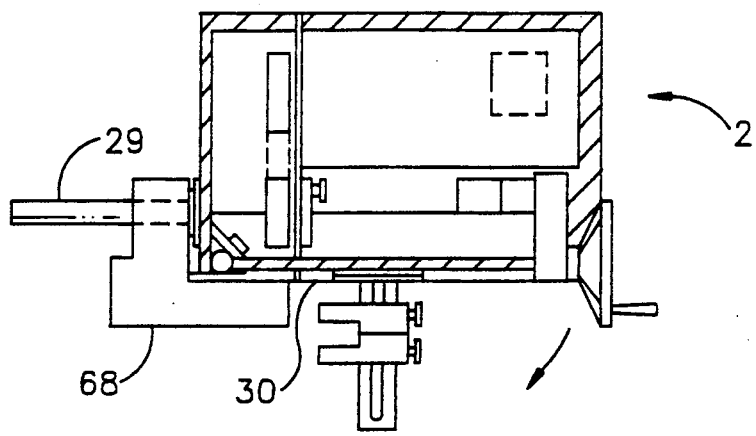
FIG. 7A is a top plan view of the lathe in the drum machining position with an alignment fixture in place.
Figure 7B:
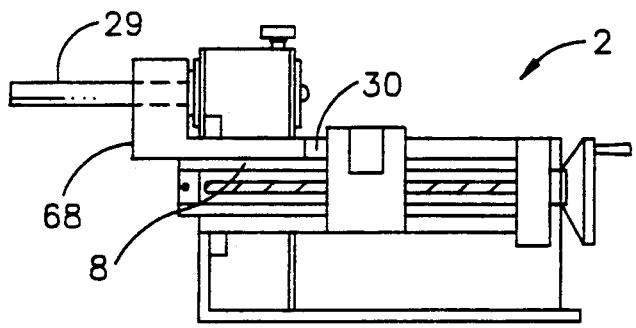
FIG. 7B is a side plan view of the lathe in the drum machining position with the alignment fixture in place.
Figure 7C:
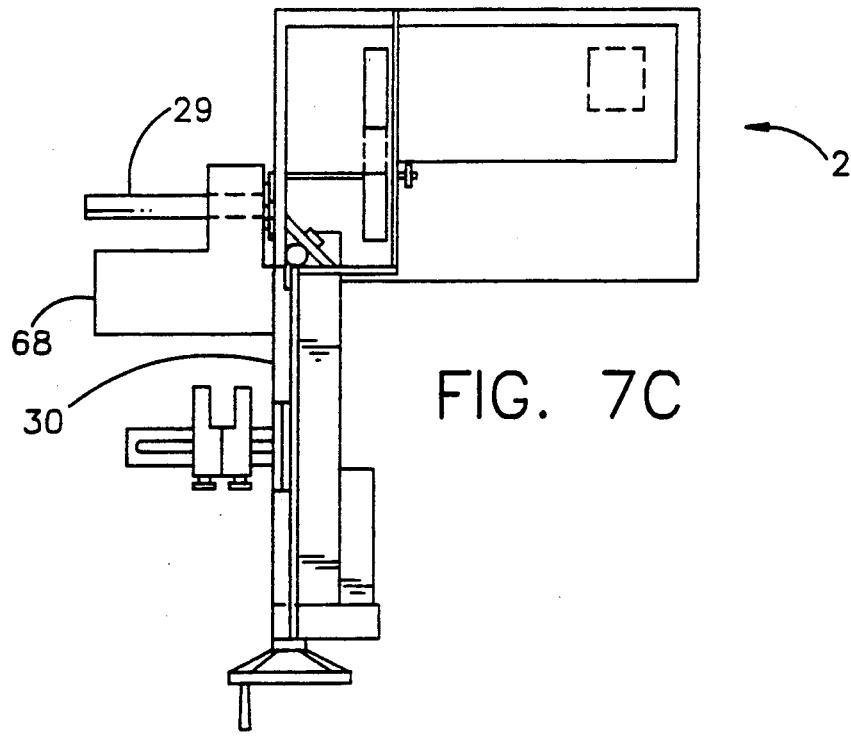
FIG. 7C is a plan view of the lathe in the rotor machining position with the alignment fixture in place.

An alignment fixture 68, shown in FIGS. 7A, 7B and 7C, is preferably used to align the tool carriage assembly 30 in either the drum or rotor machining position. The alignment fixture 68 is an L-shaped member having an aperture on the first leg 70 adapted to slide over the arbor 29.

When the fixture 68 has been installed on the arbor 29 with the assembly 8 in the drum position, the second leg 72 aligns with the carriage mount 30. If there is no gap between the mount 30 and the fixture 68, the assembly 8 is parallel with the arbor 29. If a gap is visible, or detected over 0.0005" with a feeler gauge, the adjustment screw 66 is adjusted to remove the gap.

When the assembly 8 is in the rotor position, the fixture 68 is turned around so a boss 74 on the first leg 70 aligns with the carriage mount 30. Following the above proceedure, the adjustment screw 64 is used to align the assembly 8.

The electronics of the brake lathe include a main power cut off switch, a momentary cutter head cut off switch at the end of the carriage mount 30 and an integrated printed circuit board cooperating with the tool motor.

Both electric motor are preferrably 115V, 60 cycle. The main drive motor 16 is a ⅛ HP parallel shaft gear motor having an 85 r.p.m. shaft. The cutter head drive motor is a 1/29 HP, infinitely variable speed SCR controlled motor. The drive belts on each are preferably GATES POLYCHAIN GT drive belts.

The use, operation and function of the invention are as follows.

Figure 1:
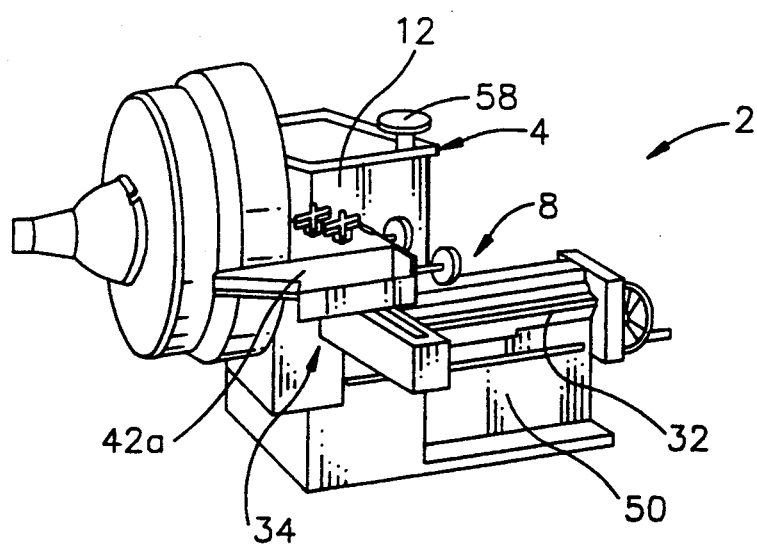
FIG. 1 is a perspective view showing the brake lathe of the present invention in the position for machining of a brake drum.
Figure 3:
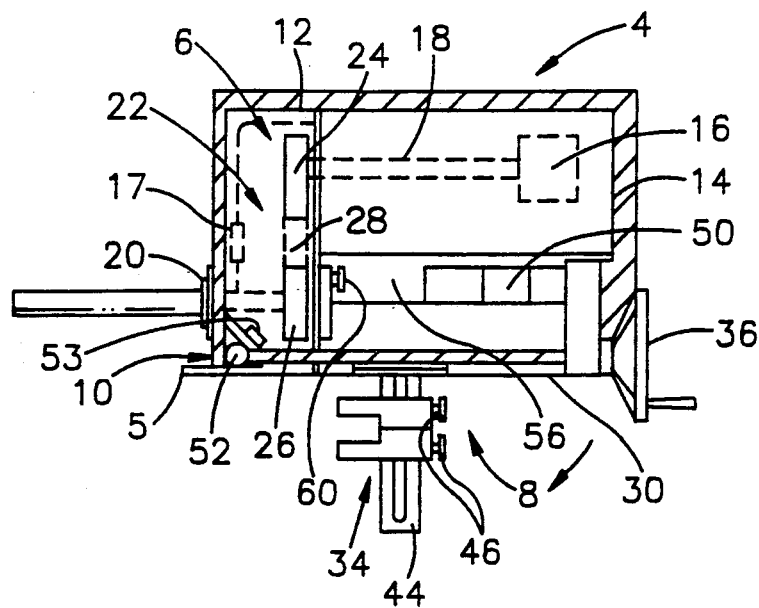
FIG. 3 is a top plan view, partially in section, showing the brake lathe of the present invention in the position for machining of a brake drum.
Figure 5:
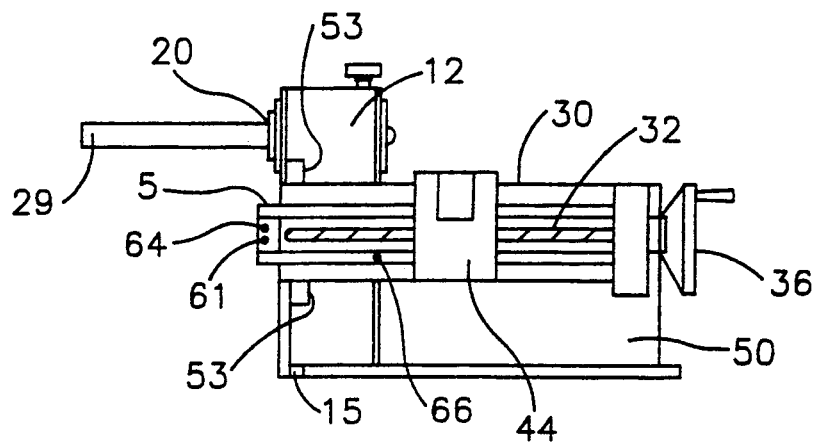
FIG. 5 is a side plan view showing the brake lathe of the present invention in the position for machining of a brake drum.
Figure 6:
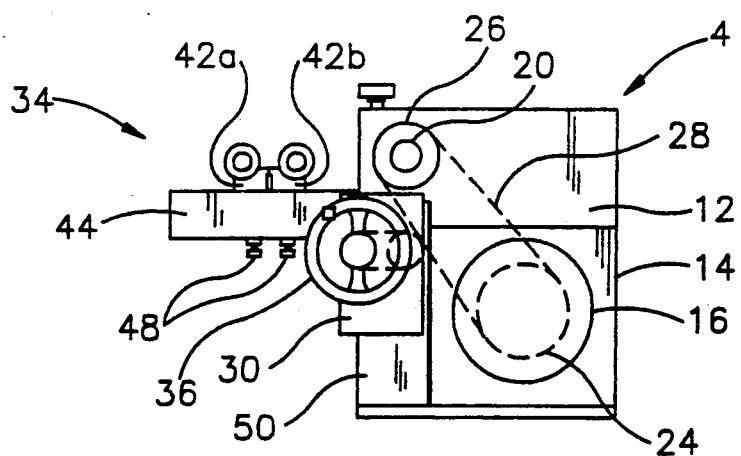
FIG. 6 is a back plan view, partially in section, showing the brake lathe of the present invention in the position for machining a brake rotor.

The brake lathe 2 is intended for use with brake drums and rotors to machine, refinish or resurface the friction surfaces on either brake drums or brake rotors. In the drum machining position, as shown in FIGS. 1, 5 and 6, the lead screw 32 of the tool carriage assembly 8 is approximately parallel to the spindle axis. The drum position locking screw down assembly 58 is screwed down to engage the detent 59 in the assembly 8 and the fixture 68 is used in conjunction with adjustment screw 66 to align the tool carriage assembly 8.

A brake drum of a conventional type is mounted on the arbor 29 by any suitable mounting means, the details of which are not important here. The inner tool holder 42b is aligned with the friction surface of the drum to provide the desired cut and the outer tool holder 42a is moved to the end of the tool race 44 so as not to interfere with the machining function. The tool on the inner tool holder 42b may be moved across the friction surface of the drum either by hand with the hand wheel 36 or automatically by the tool carriage drive motor in the tool motor housing 50 to machine the cylindrical friction surface on the interior of the brake drum.

When the brake lathe 2 is used to machine a brake rotor, the drum position lock 58 is unscrewed and the tool carriage assembly 8 is pivoted through an arc of approximately 90° clockwise, from the FIG. 1 position to the FIG. 2 position, around pin 52, so that the lead screw 36 of the tool carriage assembly 8 is approximately perpendicular to the spindle axis. The rotor position lock 60 engages hole 61 in the extension 5 of the tool carriage assembly 8 to lock the assembly 8 in the rotor machining position. The alignment fixture 68 is used in conjunction with adjustment screw 64 to properly align the assembly 18, as set forth above.

A conventional brake rotor is mounted on the arbor 29 by any suitable mounting arrangement, the details of which are not important here. Two tool holders 42 with a tool attached to each, allowing the machining of both sides of the brake rotor simultaneously, are set to the desired positions for machining both sides of the rotor. The tool carriage 34 and, thus, the tools are brought to the brake rotor either manually by the hand wheel 36 or automatically under power from the tool carriage motor (not shown) located in the tool motor housing 50.

The device 2 has the advantage that it can be used to machine either worn rotors or drums with the conversion time being minimal. Further, the conversion between drum and rotor machining requires no removal or addition of any cutting tools.

Moreover, the pivotable tool carriage assembly design is simple and creates no sealing problems or bearing difficulties. The modular design of the tool carriage assembly 8 allows easy removal of the entire assembly 8, including the tool drive motor and related electronics for removal and shipment to a service dealer without the need for a serviceman to visit the site.

Whereas the preferred form of the invention has been shown and suggested, it should be understood that suitable additional modifications, changes, substitutions and alterations may be made without departing from the fundamental spirit of the invention.

I claim:

1. A brake lathe comprising a spindle on which a piece to be tooled is mounted, drive means for rotating said spindle, a tool carriage assembly including a tool carriage and tool carriage drive means, said tool carriage drive means comprising a lead screw coupled to the tool carriage to move the tool carriage along said lead screw, tool carriage assembly mounting means including pivot means and locking means to pivot the tool carriage through an arc of about 90° to dispose and lock the tool carriage either approximately parallel to the axis of the spindle in a brake drum machining position or approximately perpendicular to the axis of the spindle in a brake rotor machining position.

2. The brake lathe according to claim 1 wherein the pivot means comprises a pin which engages the tool carriage assembly around which the tool carriage assembly pivots.

3. The brake lathe according to claim 2 further comprising release means which allow removal of the pin and, therefore, removal of the tool carriage assembly.

4. The brake lathe according to claim 3 wherein the release means comprises bolts which support the pin.

5. The brake lathe according to claim 1 further comprising alignment means to assure proper alignment of the tool carriage assembly with the spindle when the tool carriage assembly is in the rotor and drum machining positions.

6. The brake lathe according to claim 1 wherein the tool carriage assembly further comprises a tool carriage drive motor to turn the drive screw and move the tool carriage along said lead screw.

7. The brake lathe according to claim 1 wherein the tool carriage assembly further comprises a wheel to turn the drive screw and move the tool carriage along said lead screw.

8. The brake lathe according to claim 1, wherein the tool carriage further comprises two tool holders, an inner tool holder and and outer tool holder each having a tool attached thereto, which are movably mounted on a tool race.

9. The brake lathe according to claim 8 wherein when the tool carriage assembly is in its drum machining assembly the outer tool holder is moved outward on the tool race to avoid interference with the drum and the inner tool holder is moved into machining contact with the friction surface on the interior of the drum.

10. The brake lathe according to claim 8 wherein when the tool carriage assembly is in its rotor machining position the outer tool holder is moved on the tool race into machining contact position relative to the outer friction surface of the rotor and the inner tool holder is moved on the tool race into machining contact position relative to the inner friction surface of the rotor so that both friction surfaces can be machined simultaneously.

* * * * *